(12) United States Patent
Kim et al.

(10) Patent No.: US 12,098,871 B2
(45) Date of Patent: Sep. 24, 2024

(54) VEHICLE AIR-CONDITIONING SYSTEM

(71) Applicant: Hanon Systems, Daejeon (KR)

(72) Inventors: Yun Jin Kim, Daejeon (KR); Jae Chun You, Daejeon (KR); Yo Chan Min, Daejeon (KR); Dong Hee Ye, Daejeon (KR)

(73) Assignee: Hanon Systems, Daejeon (KR)

( * ) Notice: Subject to any disclaimer, the term of this patent is extended or adjusted under 35 U.S.C. 154(b) by 219 days.

(21) Appl. No.: 17/776,843

(22) PCT Filed: Oct. 19, 2020

(86) PCT No.: PCT/KR2020/014246
§ 371 (c)(1),
(2) Date: May 13, 2022

(87) PCT Pub. No.: WO2021/096083
PCT Pub. Date: May 20, 2021

(65) Prior Publication Data
US 2022/0390155 A1    Dec. 8, 2022

(30) Foreign Application Priority Data

Nov. 14, 2019  (KR) .................. 10-2019-0145733
Nov. 14, 2019  (KR) .................. 10-2019-0145734

(51) Int. Cl.
*F25B 39/02*  (2006.01)
*F25B 13/00*  (2006.01)

(52) U.S. Cl.
CPC .............. *F25B 39/02* (2013.01); *F25B 13/00* (2013.01)

(58) Field of Classification Search
CPC ................................ F25B 39/02; F25B 13/00
(Continued)

(56) References Cited

U.S. PATENT DOCUMENTS

2013/0086930 A1    4/2013  Scherer et al.
2018/0290520 A1   10/2018  Hipp-Kalthoff et al.

FOREIGN PATENT DOCUMENTS

CN   103090575 A   5/2013
JP     6528844 B2   6/2019
(Continued)

OTHER PUBLICATIONS

Office Action issued on Dec. 19, 2023 by the KIPO in the corresponding Patent Application No. KR10-2019-0145733, with English translation.
(Continued)

*Primary Examiner* — Davis D Hwu
(74) *Attorney, Agent, or Firm* — Norton Rose Fulbright US LLP; James R. Crawford (57) ABSTRACT

The present invention provides a vehicle air-conditioning system comprising: a pair of evaporation units which cause heat exchange between a refrigerant and air, and which are arranged to be spaced apart from each other so as to discharge cold air in different directions; one expansion valve, which expands a low-temperature and high-pressure refrigerant so as to supply same to the evaporation unit; an inlet pipe in which the refrigerant of the expansion valve moves to a first evaporation unit; a first moving pipe in which the refrigerant having circulated through one region of the first evaporation unit moves to a second evaporation unit; a second moving pipe in which the refrigerant having circulated through the second evaporation unit moves to the first evaporation unit; and an outlet pipe through which the refrigerant having circulated through the first evaporation unit flows out.

16 Claims, 5 Drawing Sheets

(58) Field of Classification Search
USPC .......................................................... 62/515
See application file for complete search history.

(56) References Cited

FOREIGN PATENT DOCUMENTS

| KR | 20020007077 | A |   | 1/2002 |
|----|-------------|---|---|--------|
| KR | 100764941 | B1 | * | 10/2007 |
| KR | 20080103164 | A |   | 11/2008 |
| KR | 20120110266 | A | * | 10/2012 |
| KR | 101340470 | B1 |   | 12/2013 |

OTHER PUBLICATIONS

Office Action issued on Dec. 19, 2023 by the KIPO in the corresponding Patent Application No. KR10-2019-0145734, with English translation.

Office Action issued by the CIPO on May 23, 2024 in the corresponding Patent Application No. 202080077757.4, with English translation.

* cited by examiner

VEHICLE AIR-CONDITIONING SYSTEM

CROSS REFERENCE TO RELATED APPLICATIONS

This application is a national phase under 35 U.S.C. § 371 of International Application No. PCT/KR2020/014246 filed on Oct. 19, 2020, which claims the benefit of priority from Korean Patent Application Nos. 10-2019-0145733 filed on Nov. 14, 2019 and 10-2019-0145734 filed on Nov. 14, 2019. The entire contents of these applications are incorporated herein by reference in their entirety.

TECHNICAL FIELD

An embodiment relates to a vehicle air-conditioning system. More specifically, an embodiment relates to a vehicle air-conditioning system, which minimizes the temperature deviation of air discharged from each evaporator when one expansion valve and two evaporators are connected.

BACKGROUND ART

Figure 1:
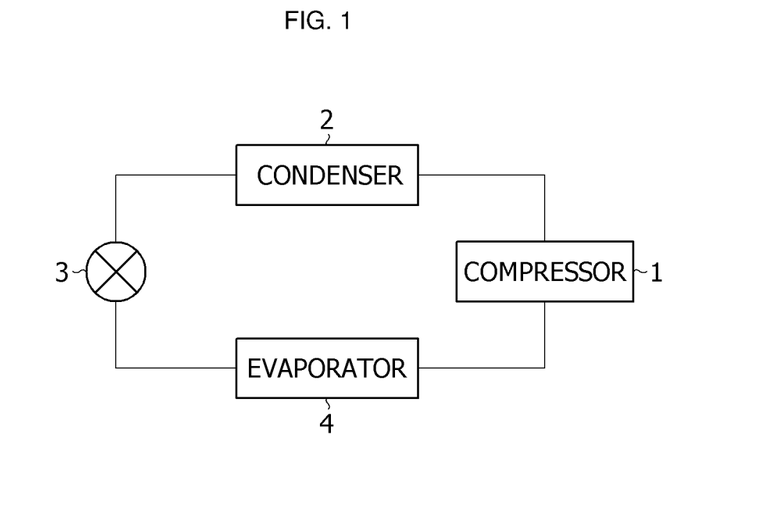
FIG. 1 is a view showing a structure of a general vehicle air-conditioning system.

As shown in FIG. 1, a general vehicle air-conditioning system is configured in a refrigeration cycle formed by connecting a compressor 1 for compressing and sending out a refrigerant, a condenser 2 for condensing the high-pressure refrigerant sent out from the compressor 1, an expansion valve 3 for throttling the refrigerant condensed and liquefied by the condenser 2, and an evaporator 4 for cooling the air discharged into an interior by a heat absorption operation due to latent heat of evaporation of the refrigerant by heat-exchanging and evaporating the low-pressure liquid refrigerant throttled by the expansion valve 3 with the air blown into the vehicle interior, with a refrigerant pipe, and interior of the vehicle is cooled through the following refrigerant circulation process.

When a cooling switch (not shown) of the air-conditioning system is turned on, first, the compressor 1 is driven by the power of an engine or a motor to suction and compress a low-temperature and low-pressure gaseous refrigerant to send out the refrigerant to the condenser 2 in a high-temperature and high-pressure gaseous state, and the condenser 2 heat-exchanges the gaseous refrigerant with external air to condense the refrigerant into a high-temperature and high-pressure liquid. Subsequently, the liquid refrigerant sent out from the condenser 2 in the high-temperature and high-pressure state is rapidly expanded by the throttling operation of the expansion valve 3 and sent to the evaporator 4 in a low-temperature, low-pressure, and wet-saturated state, and the evaporator 4 heat-exchanges the refrigerant with the air blown into the vehicle interior by a blower (not shown). Therefore, the refrigerant is evaporated by the evaporator 4 and discharged in the low-temperature and low-pressure gaseous state, and again sucked into the compressor 1 to recirculate through the refrigeration cycle as described above.

In the refrigerant circulation process, the vehicle interior is cooled by discharging the air blown by the blower (not shown) into the vehicle interior in a state of being cooled and cold by the latent heat of evaporation of the liquid refrigerant circulated in the evaporator 4 through the evaporator 4 as described above.

In such a general vehicle air-conditioning system, one expansion valve is used for one evaporator, and when a plurality of evaporators are used, the number of parts increases.

In addition, there is a problem in that a structure for connecting the plurality of evaporators to the expansion valve is complicated.

Technical Problem

An embodiment is directed to supplying a refrigerant from one expansion valve to two evaporators and minimizing the temperature deviation of the air discharged from each evaporator.

The object of the present invention is not limited to the aforementioned object and other objects not mentioned herein will be clearly understood by those skilled in the art from the following description.

Technical Solution

One aspect of the present invention provides a vehicle air-conditioning system including: a pair of evaporation units with a two-row structure causing heat exchange between a refrigerant and air and arranged to be spaced apart from each other to discharge cold air in different directions; and one expansion valve configured to expand a low-temperature and high-pressure refrigerant to supply the refrigerant to the evaporation unit, in which the refrigerant discharged from the expansion valve passes through a second row of a first evaporation unit, sequentially circulates through a second evaporation unit, and passes through a first row of the first evaporation unit.

Preferably, the evaporation unit may include the first evaporation unit and the second evaporation unit, and may further include an inlet pipe in which the refrigerant of the expansion valve moves to the first evaporation unit; a first moving pipe in which the refrigerant circulated through one region of the first evaporation unit moves to the second evaporation unit; a second moving pipe in which the refrigerant circulated through the second evaporation unit moves to the first evaporation unit; and an outlet pipe through which the refrigerant circulated through the first evaporation unit flows out.

Preferably, an inflow and an outflow in each of the first evaporation unit and the second evaporation unit may occur in different rows.

Preferably, the first row and the second row of the first evaporation unit may be separated from each other, and a first row and a second row of the second evaporation unit may communicate with each other.

Preferably, the inlet pipe may be connected to the second row in the first evaporation unit, the first moving pipe may be connected to the second row of the first evaporation unit and the second row of the second evaporation unit, the second moving pipe may be connected to the first row of the second evaporation unit and the first row of the first evaporation unit, and the outlet pipe may be connected to the first row of the first evaporation unit.

Preferably, the pair of evaporation units may have an inclination.

Preferably, a blower may be arranged above the evaporation unit.

Preferably, the inlet and outlet of the evaporation unit may be arranged on an upper side of the evaporation unit with respect to the inclination.

Another aspect of the present invention provides a vehicle air-conditioning system including: a pair of evaporation units with a two-row structure causing heat exchange between a refrigerant and air and arranged to be spaced apart from each other to discharge cold air in different directions;

and one expansion valve configured to expand a low-temperature and high-pressure refrigerant to supply the refrigerant to the evaporation unit, in which the refrigerant discharged from the expansion valve circulates through a first evaporation unit and then sequentially circulates through a second evaporation unit.

Preferably, the evaporation unit may include the first evaporation unit and the second evaporation unit, and may further include an inlet pipe configured to supply the refrigerant of the expansion valve to the first evaporation unit; a moving pipe in which the refrigerant moving from the first evaporation unit moves to the second evaporation unit; and an outlet pipe through which the refrigerant of the second evaporation unit flows out.

Preferably, an inflow and an outflow in each of the first evaporation unit and the second evaporation unit may occur in different rows.

Preferably, in the first evaporation unit, the inlet pipe may be connected to a second row and one side of the moving pipe may be connected to a first row, and in the second evaporation unit, the other side of the moving pipe may be connected to a second row, and the outlet pipe may be connected to a first row.

Preferably, the pair of evaporation units may have an inclination.

Preferably, a blower may be arranged above the evaporation unit.

Preferably, the inlet and outlet of the evaporation unit may be arranged on an upper side of the evaporation unit with respect to the inclination.

Preferably, the inlet and the outlet may be arranged in the same direction of the evaporation unit.

Advantageous Effects

According to an embodiment, it is possible to minimize the temperature deviation of the air discharged using one expansion valve in an air-conditioning system with two or more evaporators.

In addition, it is possible to reduce the cost by reducing the number of expansion valves and parts for connecting the evaporators.

In addition, it is possible to simplify the configuration of an inlet side of the evaporator.

Various and beneficial advantages and effects of the present invention are not limited to the aforementioned description and will be understood more easily in the process of describing the specific embodiment of the present invention.

MODES OF THE INVENTION

Hereinafter, preferred embodiments of the present invention will be described in detail with reference to the accompanying drawings.

However, the technical spirit of the present invention is not limited to some embodiments to be described but may be implemented in various different forms, and one or more of the components may be used by being selectively coupled or substituted between the embodiments within the scope of the technical spirit of the present invention.

In addition, terms (including technical and scientific terms) used in the embodiments of the present invention may be interpreted as the meaning that may be generally understood by those skilled in the art to which the present invention pertains, unless specifically defined and described explicitly, and the meaning of the commonly used terms such as terms defined in the dictionary may be interpreted in consideration of the contextual meaning of the related art.

In addition, the terms used in the embodiments of the present invention are for describing the embodiments and are not intended to limit the present invention.

In this specification, a singular form may also include a plural form unless otherwise specified in the phrase, and when "at least one (or one or more) of A, B, and C" are described, this may include one or more of all possible combinations of A, B, and C.

In addition, in describing the components of the embodiment of the present invention, terms such as first, second, A, B, (a), and (b) may be used.

These terms are only for distinguishing the component from other components, and are not limited to the essence, sequence, or order of the corresponding component by the terms.

In addition, when a component is described as being 'connected', 'coupled' or 'joined' to another component, the component is not only directly connected, coupled or joined to another component, but also is 'connected', 'coupled' or 'joined' by other components present between the component and another component.

In addition, in case of being described as being formed or arranged "on (above) or below (under)" of each component, the on (above) or below (under) includes not only a case where two components are in contact with each other but also a case where one or more other components are formed or arranged between two components. In addition, in case of being described as "on (above) or below (under)", this may include the meanings of downward as well as upward with respect to one component.

Hereinafter, the embodiment will be described in detail with reference to the accompanying drawings, and the same or corresponding components are given the same reference numerals regardless of reference numerals indicated in the drawings, and overlapping descriptions thereof will be omitted.

FIGS. 2 to 6 show only main characteristic parts in order to conceptually clearly understand the present invention, and as a result, various modifications of the drawings are expected, and the scope of the present invention is not needed to be limited to the specific shape shown in the drawings.

Figure 2:
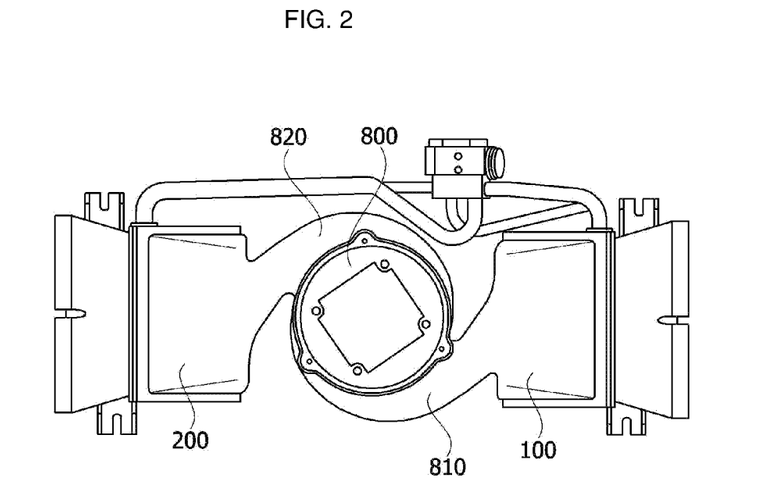
FIG. 2 is a schematic view of a vehicle air-conditioning system according to an embodiment of the present invention.

FIG. 2 is a schematic view of a vehicle air-conditioning system according to an embodiment of the present invention.

Referring to FIG. 2, in the vehicle air-conditioning system according to an embodiment of the present invention, a blower 800 may be arranged on a central portion thereof and a first evaporation unit 100 and a second evaporation unit 200 may be arranged on both sides of the blower 800.

The air discharged from the blower 800 may be connected to the first evaporation unit 100 through a first connection unit 810 and connected to the second evaporation unit 200 through a second connection unit 820. The air discharged from the blower 800 is supplied into a vehicle through the evaporation units 100 and 200.

Figure 3:
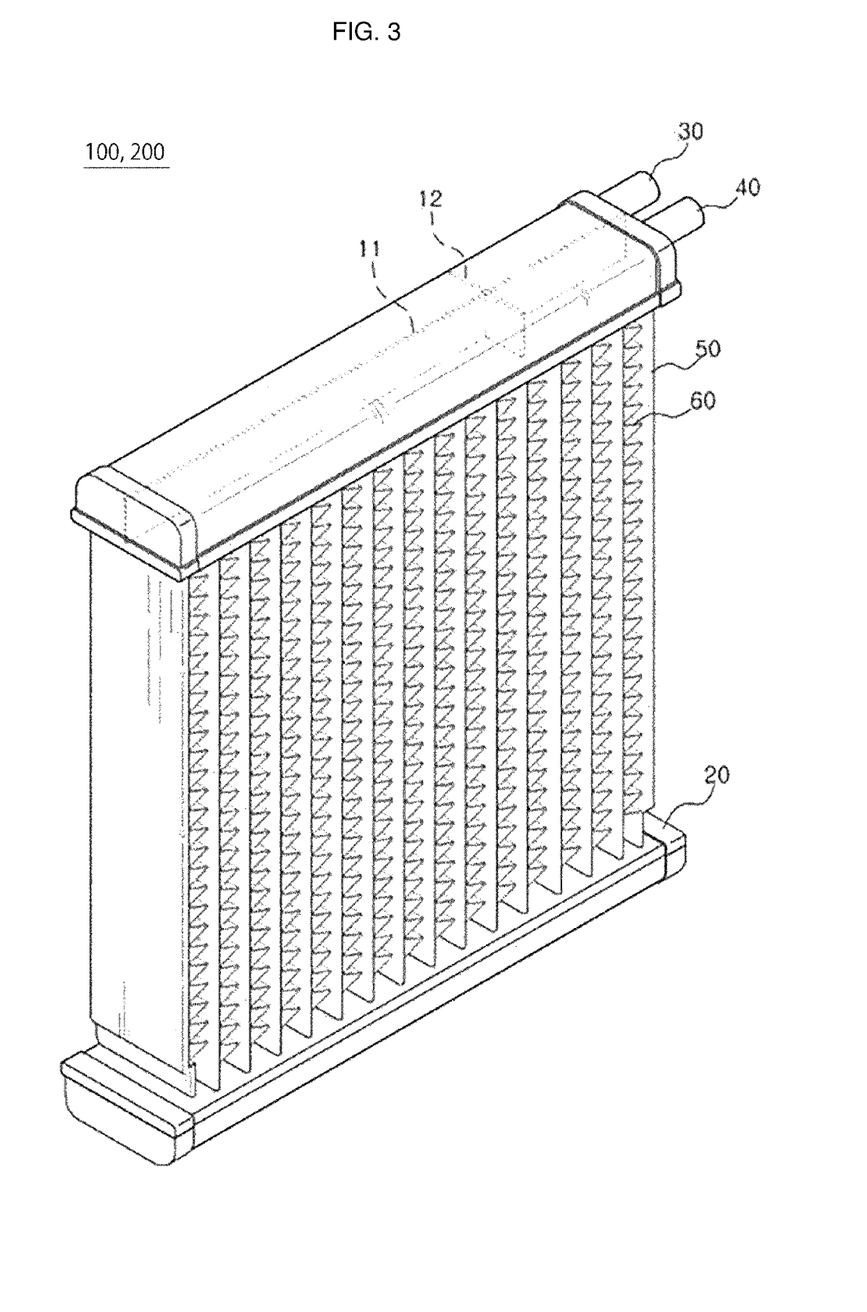
FIG. 3 is a view showing a structure of an evaporator, which is a component of FIG. 2.
Figure 4:
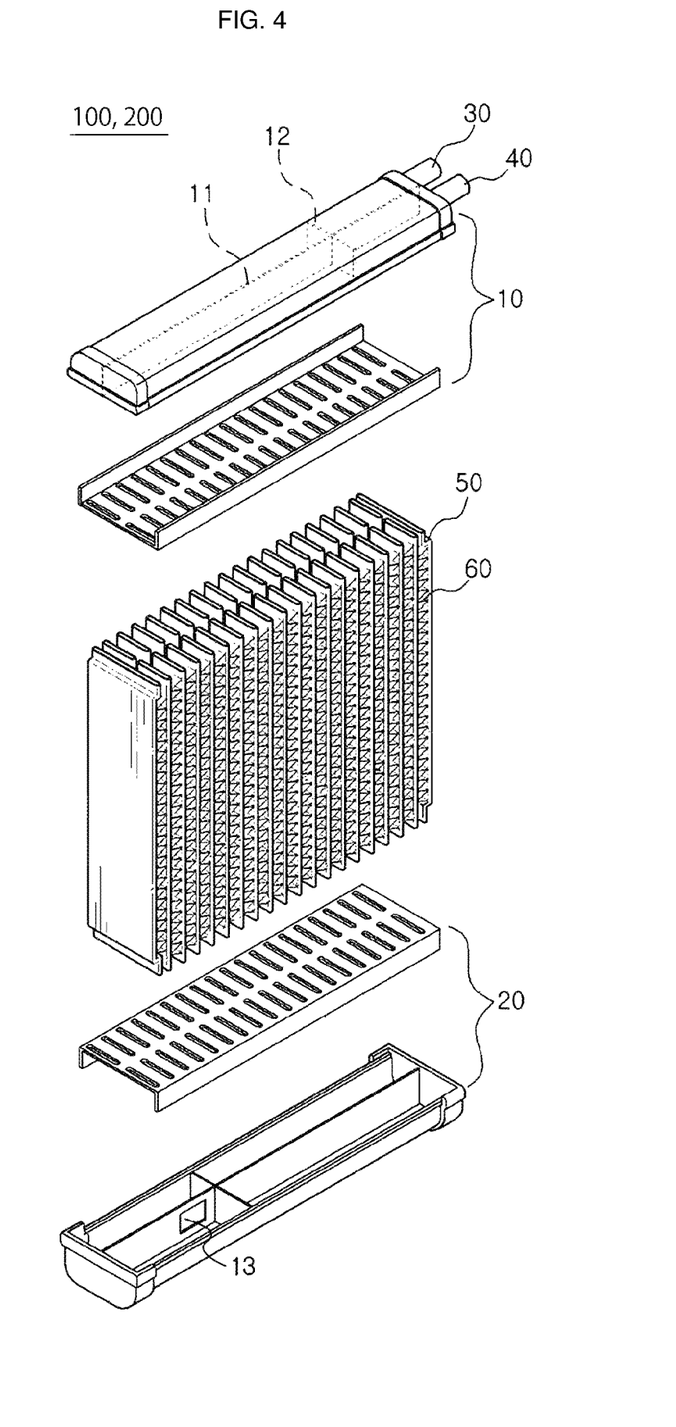
FIG. 4 is an exploded perspective view of FIG. 3.

FIG. 3 is a view showing a structure of the evaporation unit, which is a component of FIG. 2, and FIG. 4 is an exploded perspective view of FIG. 3.

The structure shown in FIGS. 3 and 4 is an example of structures of the first evaporation unit 100 and the second evaporation unit 200. The first evaporation unit 100 and the second evaporation unit 200 represent a configuration of the evaporation unit with a two-row structure, and each structure may be modified and embodied according to the embodiment. Hereinafter, only the structure of the first evaporation unit will be described.

The first evaporation unit 100 may be arranged so that a first header tank 10 and a second header tank 20 face each other, and a plurality of tubes 50 may be connected between the first header tank 10 and the second header tank 20.

In addition, fins 60 are arranged between the plurality of tubes 50 to increase heat exchange efficiency.

The first header tank 10 and the second header tank 20 may have a two-row structure, and an inlet pipe 30 and an outlet pipe 40 may be connected to the first header tank 10.

The first header tank 10 and the second header tank 20 with the two-row structure may have partition walls 11 allowing a refrigerant to move in a longitudinal direction.

Each row may be provided with a baffle 12 for forming a flow path. The baffle 12 may be arranged in a width direction of the first header tank 10 or the second header tank 20, and the number and positions of the baffles 12 may vary depending on the number of paths.

In addition, a communication unit 13 is installed on the partition wall 11 so that a refrigerant may move from a first row to a second row. The communication unit 13 may be arranged as needed and may vary depending on the connection structure of the first evaporation unit 100 and the second evaporation unit 200.

The structure of the evaporation unit shown in FIGS. 3 and 4 is to describe the basic structure of the two-row structure, and the embodiment of the present invention is not limited thereto, and the structure of the evaporation unit may be variously modified and embodied using the basic structure.

Figure 5:
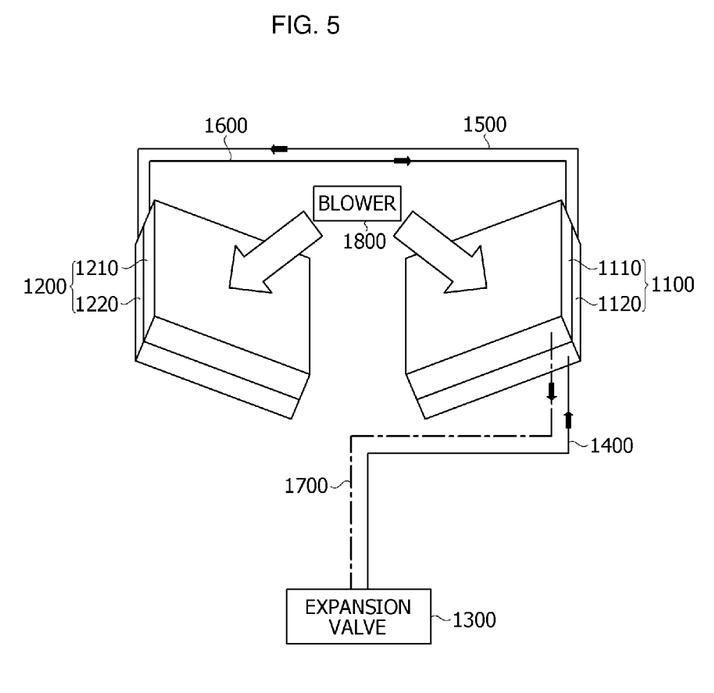
FIG. 5 is a structural view of a vehicle air-conditioning system according to one embodiment of the present invention.

FIG. 5 is a structural view of a vehicle air-conditioning system according to one embodiment of the present invention.

Referring to FIG. 5, the vehicle air-conditioning system according to one embodiment of the present invention includes: a pair of evaporation units with a two-row structure causing heat exchange between a refrigerant and air and arranged to be spaced apart from each other to discharge cold air in different directions, and one expansion valve 1300 for expanding a low-temperature and high-pressure refrigerant to supply the refrigerant to the evaporation unit, in which the refrigerant discharged from the expansion valve 1300 may pass through a second row 1120 of a first evaporation unit 1100, then sequentially circulate through a second evaporation unit 1200, and pass through a first row 1110 of the first evaporation unit 1100.

The present invention is provided with a structure in which the refrigerant discharged from one expansion valve 1300 circulates through the second row 1120 of the first evaporation unit 1100, then circulates through the entire second evaporation unit 1200, and circulates through the first row 1110 of the first evaporation unit 1100 again.

At this time, the first evaporation unit 1100 and the second evaporation unit 1200 may be arranged so that the refrigerant flowing into the first evaporation unit 1100 and the second evaporation unit 1200 flows into the second rows 1120 and 1220 and flows out of the first rows 1110 and 1210.

When the refrigerant discharged from one expansion valve 1300 moves from the evaporation unit, heat loss occurs. The present invention is directed to minimizing the temperature deviation of the discharged air in consideration of the temperature of the refrigerant and the position where the refrigerant circulates through the evaporation units 1100 and 1200.

The embodiment of the present invention may include the evaporation unit, the expansion valve 1300, an inlet pipe 1400, a first moving pipe 1500, a second moving pipe 1600, and an outlet pipe 1700.

The pair of evaporation units 1100, 1200 are provided and are arranged to be spaced apart from each other so that the refrigerant and the air may exchange heat. The pair of evaporation units are provided to discharge cold air in different directions. The arrangement position of the evaporation units may be variously modified and embodied depending on the direction in which the cold air is discharged or a structure of a duct.

As one embodiment, the evaporation unit may include a pair of header tanks, a plurality of tubes connecting the header tanks so that a refrigerant moves, and a fin arranged between the tubes. The structure of the evaporation unit is not limited and may be variously modified and embodied.

According to the present invention, the evaporation unit includes the first evaporation unit 1100 and the second evaporation unit 1200 arranged to be spaced apart from each other, each of which may be arranged in the two-row structure.

The first evaporation unit 1100 may include the first row 1110 arranged on the top and the second row 1120 arranged below the first row 1110 and 1210. However, the first evaporation unit 1100 arranged in two rows may have a structure in which the first row 1110 and the second row 1120 are separated from each other. This means that the refrigerant does not move between the header tanks arranged in each row.

The second evaporation unit 1200 may include the first row 1210 arranged on the top and the second row 1220 arranged below the first row 1210. However, the second evaporation unit 1200 arranged in two rows may have a structure in which the first row 1210 and the second row 1220 communicate with each other so that the refrigerant moves. This means that the refrigerant moves between the header tanks arranged in each row.

In other words, the refrigerant flowing into the second row 1120 of the first evaporation unit 1100 does not move to the first row 1110 and moves to the second evaporation unit 1200. Thereafter, the refrigerant flowing into the second row 1220 of the second evaporation unit 1200 is connected to the first row 1210 through the header tank, circulates through the first row 1210, and then moves to the first row 1110 of the first evaporation unit 1100. Therefore, it is possible to increase the circulation efficiency of the refrigerant.

The first evaporation unit 1100 and the second evaporation unit 1200 may be arranged to have an inclination. This is to facilitate the circulation of the cold air discharged through the first evaporation unit 1100 and the second evaporation unit 1200. Inclined angles of the first evaporation unit 1100 and the second evaporation unit 1200 are not limited and may be variously modified and embodied depending on the position of the duct in which the cold air circulates.

Blowers 1800 are arranged above the evaporation units 1100, 1200 to move the heat-exchanged cold air to the evaporation units. A shape of the blower 1800 is not limited and the blowers 1800 may be each arranged above the pair of evaporation units, or one blower 1800 may have a structure with two discharging ports and each discharging port may be arranged to face each evaporation unit.

The expansion valve 1300 may expand the low-temperature and high-pressure refrigerant to supply the refrigerant to the first evaporation unit 1100.

As shown in FIG. 1, the general vehicle air-conditioning system is provided as a system including a compressor for compressing and sending out refrigerant, and a condenser, an expansion valve, and an evaporator through which the refrigerant circulates.

At this time, the expansion valve 1300 may rapidly expand the liquid refrigerant sent out from the condenser in the high-temperature and high-pressure state by the throttling operation of the expansion valve 1300 to supply a the low-temperature, low-pressure, and wet-saturated refrigerant to the evaporation unit. According to the present invention, the structure of the expansion valve 1300 is not limited and the expansion valve 1300 may be modified and embodied in various structures.

The inlet pipe 1400, the first moving pipe 1500, the second moving pipe 1600, and the outlet pipe 1700 constitute a moving line of the refrigerant.

The inlet pipe 1400 provides a passage in which the refrigerant discharged from the expansion valve 1300 moves to the first evaporation unit 1100.

The first moving pipe 1500 provides a passage in which the refrigerant circulated through one region of the first evaporation unit 1100 moves to the second evaporation unit 1200.

The second moving pipe 1600 provides a passage in which the refrigerant circulated through the second evaporation unit 1200 moves to the first evaporation unit 1100.

The outlet pipe 1700 provides a passage through which the refrigerant circulated through another region of the first evaporation unit 1100 flows out.

As one embodiment, in the first evaporation unit 1100, the inlet pipe 1400 may be connected to the second row 1120, the first moving pipe 1500 may be connected to the second row 1120 of the first evaporation unit 1100 and the second row 1220 of the second evaporation unit 1200, the second moving pipe 1600 may be connected to the first row 1210 of the second evaporation unit 1200 and the first row 1110 of the first evaporation unit 1100, and the outlet pipe 1700 may be connected to the first row 1110 of the first evaporation unit 1100 to provide the passage through which the refrigerant circulates.

According to the present invention, the inlet pipe 1400, the first moving pipe 1500, the second moving pipe 1600, and the outlet pipe 1700 are provided in a tubular structure to provide the passage in which the refrigerant may move therein, and the shapes or arrangement structures thereof may be variously modified and embodied. However, it is preferable that the above components are arranged in the shortest distance in order to prevent the heat loss of the refrigerant.

According to the present invention, an inflow and an outflow in the first evaporation unit 1100 and the second evaporation unit 1200 with the two-row structure may occur in different rows.

As one embodiment, in the first evaporation unit 1100, the inlet pipe 1400 is connected to the second row 1120, and one side of the first moving pipe 1500 is connected to the second row 1120. In the second evaporation unit 1200, the other side of the first moving pipe 1500 is connected to the second row 1220, and one side of the second moving pipe 1600 is connected to the first row 1210 of the second evaporation unit 1200, and the other side of the second moving pipe 1600 is connected to the first row 1110 of the first evaporation unit 1100. Thereafter, the outlet pipe 1700 may be connected to the first row 1210 of the first evaporation unit 1100.

The second row 1120 of the first evaporation unit 1100 and the second row 1220 of the second evaporation unit 1200 mean rows arranged on the lower side of each evaporation unit, and the refrigerant having a cooler temperature among the refrigerant flowing into each evaporation unit flows into the second rows.

This is to increase cooling efficiency by allowing heat loss caused when the refrigerant moves to the evaporation unit and the refrigerant having a low temperature to exchange heat at a position close to a passenger.

In addition, the inlet and outlet of the evaporation unit may be arranged on the upper side of the evaporation unit with respect to the inclination.

As one embodiment, the moving lines of the refrigerant connected to the first evaporation unit 1100 and the second evaporation unit 1200 may be connected to the upper side of each evaporation unit with respect to the inclination.

In addition, the inlet and outlet to which the refrigerant moving line is connected may vary depending on the number of baffles arranged in the header tank of the evaporator to form the flow path of the evaporator.

As one embodiment, the pair of inlet and outlet provided in the first evaporation unit 1100 may be formed to face each other in each of the first row 1110 and the second row 1120, and the inlet and outlet provided in the second evaporation unit 1200 through which the refrigerant circulates may be arranged on one side of each of the first row 1210 and the second row 1220.

Figure 6:
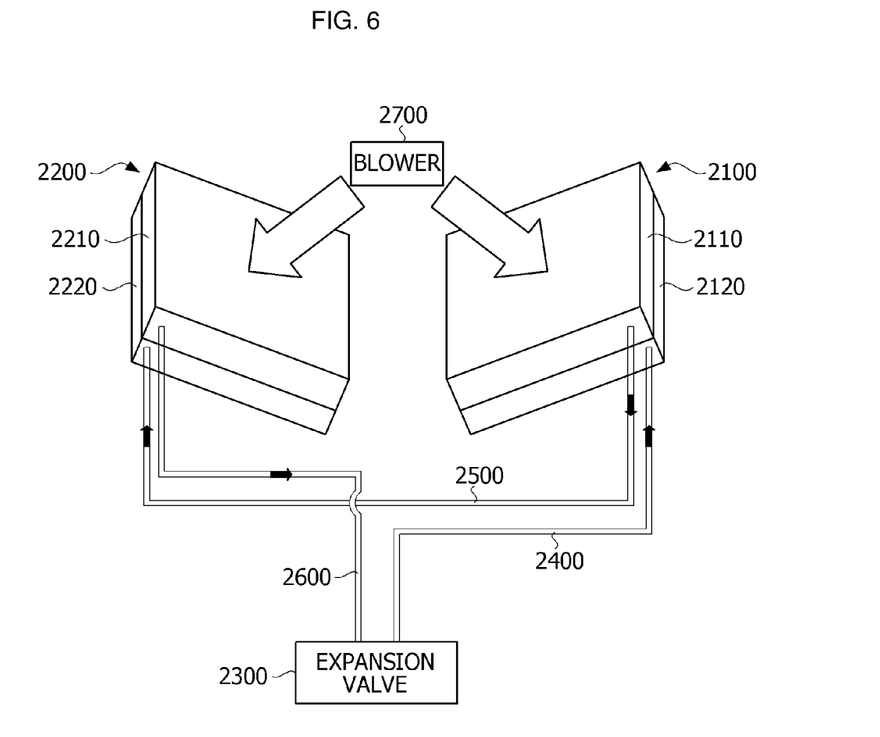
FIG. 6 is a structural view of a vehicle air-conditioning system according to another embodiment of the present invention.

FIG. 6 is a structural view of a vehicle air-conditioning system according to another embodiment of the present invention.

Referring to FIG. 6, the vehicle air-conditioning system according to another embodiment of the present invention may include: a pair of evaporation units with a two-row structure causing heat exchange between a refrigerant and air and arranged to be spaced apart from each other to discharge cold air in different directions, and one expansion valve 2300 for expanding a low-temperature and high-pressure refrigerant to supply the refrigerant to the evaporation unit, in which the refrigerant discharged from the expansion valve 2300 may circulate through a first evaporation unit 2100 and then sequentially circulate through a second evaporation unit 2200.

According to the present invention, the refrigerant discharged from one expansion valve 2300 sequentially circulates through the first evaporation unit 2100 and the second evaporation unit 2200 so that the refrigerant passes through a plurality of evaporation units.

At this time, the first evaporation unit 2100 and the second evaporation unit 2200 may be provided in a two-row structure, and arranged so that the refrigerant flows into second rows 2120 and 2220 that are sides close to a direction in which the cold air is discharged and the refrigerant flows out of first rows 2110 and 2210 in order to increase the efficiency of the evaporator due to the discharged refrigerant. Therefore, it is possible to increase the efficiency of the evaporation unit in which the refrigerant moves.

The embodiment of the present invention may include the evaporation units 2100 and 2200, the expansion valve 2300, an inlet pipe 2400, a moving pipe 2500, and an outlet pipe 2600.

A pair of evaporation units 2100 and 2200 are provided and are arranged to be spaced apart from each other so that the refrigerant and the air may exchange heat. The pair of evaporation units are provided to discharge cold air in different directions. The arrangement position of the evaporation unit may be variously modified and embodied depending on the direction in which the cold air is discharged or a structure of a duct.

As one embodiment, the evaporation unit may include a pair of header tanks, a plurality of tubes connecting the header tanks so that the refrigerant moves, and a fin arranged between the tubes. The structure of the evaporation unit is not limited and may be variously modified and embodied.

According to the present invention, the evaporation unit includes the first evaporation unit 2100 and the second evaporation unit 2200 arranged to be spaced apart from each other, each of which may be arranged in a two-row structure. The first evaporation unit 2100 and the second evaporation unit 2200 may have the same structure.

The first evaporation unit 2100 may have the two-row structure communicating through the header tank.

Each of the first evaporation unit 2100 and the second evaporation unit 2200 may include the first rows 2110 and 2210 arranged on the top and the second rows 2120 and 2220 arranged below the first rows 2110 and 2210, and the first rows 2110 and 2210 and the second rows 2120 and 2220 may be connected through the header tank.

In other words, the refrigerant flowing into the second row 2120 of the first evaporation unit 2100 circulates through the second row 2120, then moves to the first row 2110 through the header tank, circulates through the first row 2110 and then moves to the second evaporation unit 2200. Therefore, it is possible to increase the circulation efficiency of the refrigerant.

The first evaporation unit 2100 and the second evaporation unit 2200 may be arranged to have an inclination. This is to facilitate the circulation of the cold air discharged through the first evaporation unit 2100 and the second evaporation unit 2200. Inclined angles of the first evaporation unit 2100 and the second evaporation unit 2200 are not limited and may be variously modified and embodied depending on the position of the duct through which the cold air circulates.

Blowers 2700 may be arranged above the evaporation units 2100 and 2200 to move the heat-exchanged cold air to the evaporation units. A shape of the blower 2700 is not limited, and the blowers 2700 may be each arranged above the pair of evaporation units 2100 and 2200, or one blower 2700 has a structure with two discharging ports and each discharging port may be arranged to face each of the evaporation units 2100 and 2200.

The expansion valve 2300 may expand the low-temperature and high-pressure refrigerant to supply the refrigerant to the evaporation units 2100 and 2200.

As shown in FIG. 1, the general vehicle air-conditioning system is provided as the system including the compressor for compressing and sending out refrigerant, and the condenser, the expansion valve, and the evaporator through which the refrigerant circulates.

At this time, the expansion valve 2300 may rapidly expand the liquid refrigerant sent out from the condenser in the high-temperature and high-pressure state by the throttling operation of the expansion valve 2300 to supply the low-temperature, low-pressure, and wet-saturated refrigerant to the evaporation unit. According to the present invention, the structure of the expansion valve 2300 is not limited and the expansion valve 2300 may be modified and embodied in various structures.

The inlet pipe 2400 provides a passage in which the refrigerant discharged from the expansion valve 2300 moves to the first evaporation unit 2100.

The moving pipe 2500 provides a passage in which the refrigerant circulated through the first evaporation unit 2100 moves to the second evaporation unit 2200.

The outlet pipe 2600 provides a passage in which the refrigerant circulated through the second evaporation unit 2200 moves.

According to the present invention, the inlet pipe 2400, the moving pipe 2500, and the outlet pipe 2600 are provided in a tubular structure to provide a passage in which the refrigerant may move therein, and the shapes or arrangement structures thereof may be variously modified and embodied. However, it is preferable that the above components are arranged in the shortest distance in order to prevent the heat loss of the refrigerant.

According to the present invention, an inflow and an outflow in the first evaporation unit 2100 and the second evaporation unit 2200 with the two-row structure may occur in different rows.

As one embodiment, in the first evaporation unit 2100, the inlet pipe 2400 may be connected to the second row 2120 and one side of the moving pipe 2500 may be connected to the first row 2110, and in the second evaporation unit 2200, the other side of the moving pipe 2500 may be connected to the second row 2220 and the outlet pipe 2600 may be connected to the first row 2210.

The second row 2120 of the first evaporation unit 2100 and the second row 2220 of the second evaporation unit 2200 mean rows arranged on the lower side of each evaporation unit, and the refrigerant having a cooler temperature among the refrigerant flowing into each evaporation unit flows into the second rows.

This is to increase cooling efficiency by allowing heat loss caused when the refrigerant moves to the evaporation unit and the refrigerant having a low temperature to exchange heat at the position close to a passenger.

In addition, the inlet and outlet of the evaporation unit may be arranged on the upper side of the evaporation unit with respect to the inclination.

As one embodiment, the inlet pipe 2400 connected to the first evaporation unit 2100 and through which the refrigerant flows may be arranged on the upper side of the second row 2120, and one side of the moving pipe 2500 connected to the first row 2110 and through which the refrigerant is discharged may be arranged on the upper side of the first row 2110. In addition, the other side of the moving pipe 2500 connected to the second evaporation unit 2200 and through which the refrigerant flows may be arranged on the upper side of the second row 2220 and the outlet pipe 2600 connected to the first row 2210 and through which the refrigerant is discharged may be arranged on the upper side of the first row 2210.

In addition, the inlet and outlet may vary depending on the number of baffles arranged in the header tank of the evaporator to form the flow path of the evaporator.

As one embodiment, the inlet and the outlet are arranged in the same direction in the first evaporation unit 2100 and the second evaporation unit 2200 to minimize the space required for connecting the pipes. However, the inlet and the outlet are not limited to those shown in FIG. 2 and may be variously modified and embodied.

As described above, the embodiments of the present invention have been described in detail with reference to the accompanying drawings.

The above descriptions are merely illustrative of the technical spirit of the present invention, and those skilled in the art to which the present invention pertains may variously modify, change, and substitute the present invention without departing from the essential characteristics of the present invention. Therefore, the embodiments and the accompanying drawings disclosed in the present invention are to describe the technical spirit of the present invention rather than limiting it, and the scope of the technical spirit of the present invention is not limited by these embodiments and the accompanying drawings. The scope of the present invention should be interpreted by the appended claims, and all technical spirits within the scope equivalent thereto should be interpreted as being included in the scope of the present invention.

The invention claimed is:

1. A vehicle air-conditioning system comprising:
   a first evaporation unit and a second evaporation unit with a two-row structure causing heat exchange between a refrigerant and air and arranged to be spaced apart from each other to discharge cold air in different directions;
   one expansion valve configured to expand low-temperature and high-pressure refrigerant to supply the refrigerant to the evaporation units;
   an inlet pipe and an outlet pipe connecting the expansion valve and the first evaporation unit; and
   a first moving pipe and a second moving pipe connecting the first evaporation unit and the second evaporation unit,
   wherein the refrigerant discharged from the first evaporation unit moves to the second evaporation unit through the first moving pipe, and
   wherein the refrigerant discharged from the second evaporation unit moves to the first evaporation unit through the second moving pipe.

2. The vehicle air-conditioning system of claim 1, wherein the refrigerant discharged from the expansion valve moves to a second row of the first evaporation unit through the inlet pipe, and
   wherein the refrigerant flowing into the first evaporation unit through the second moving pipe circulates through one area of the first evaporation unit and then moves to the expansion valve through the outlet pipe.

3. The vehicle air-conditioning system of claim 2,
   wherein an inflow and an outflow in each of the first evaporation unit and the second evaporation unit occur in different rows.

4. The vehicle air-conditioning system of claim 3,
   wherein the first row and the second row of the first evaporation unit are separated from each other, and
   a first row and a second row of the second evaporation unit communicate with each other.

5. The vehicle air-conditioning system of claim 4,
   wherein the inlet pipe is connected to the second row in the first evaporation unit,
   the first moving pipe is connected to the second row of the first evaporation unit and the second row of the second evaporation unit,
   the second moving pipe is connected to the first row of the second evaporation unit and the first row of the first evaporation unit, and
   the outlet pipe is connected to the first row of the first evaporation unit.

6. The vehicle air-conditioning system of claim 2,
   wherein the pair of evaporation units have an inclination.

7. The vehicle air-conditioning system of claim 6,
   wherein a blower is arranged above the evaporation unit.

8. The vehicle air-conditioning system of claim 6,
   wherein the inlet and outlet of the evaporation unit are arranged on an upper side of the evaporation unit with respect to the inclination.

9. A vehicle air-conditioning system comprising:
   a first evaporation unit and a second evaporation unit with a two-row structure causing heat exchange between a refrigerant and air and arranged to be spaced apart from each other to discharge cold air in different directions;
   one expansion valve configured to expand low-temperature and high-pressure refrigerant to supply the refrigerant to the evaporation unit;
   an inlet pipe connecting the expansion valve and the first evaporation unit;
   an outlet pipe connecting the expansion valve and the second evaporation unit; and
   a moving pipe connecting the first evaporation unit and the second evaporation unit,
   wherein the refrigerant discharged from the first evaporation unit moves to the second evaporation unit through the moving pipe.

10. The vehicle air-conditioning system of claim 9,
    wherein the moving pipe and the expansion valve are arranged to be spaced apart from each other.

11. The vehicle air-conditioning system of claim 10,
    wherein an inflow and an outflow in each of the first evaporation unit and the second evaporation unit occur in different rows.

12. The vehicle air-conditioning system of claim 11,
    wherein in the first evaporation unit, the inlet pipe is connected to a second row and one side of the moving pipe is connected to a first row, and
    in the second evaporation unit, the other side of the moving pipe is connected to a second row, and the outlet pipe is connected to a first row.

13. The vehicle air-conditioning system of claim 11,
    wherein the pair of evaporation units have an inclination.

14. The vehicle air-conditioning system of claim 13,
    wherein a blower is arranged above the evaporation unit.

15. The vehicle air-conditioning system of claim 14,
    wherein the inlet and outlet of the evaporation unit are arranged on an upper side of the evaporation unit with respect to the inclination.

16. The vehicle air-conditioning system of claim 15,
    wherein the inlet and the outlet are arranged in the same direction of the evaporation unit.

* * * * *